(12) United States Patent
Muppalla et al.

(10) Patent No.: US 11,763,010 B2
(45) Date of Patent: *Sep. 19, 2023

(54) METHOD AND SYSTEM OF COMPUTER GRAPHICS PROCESSING SYSTEM VALIDATION FOR PROCESSING OF ENCRYPTED IMAGE CONTENT

(71) Applicant: Intel Corporation, Santa Clara, CA (US)

(72) Inventors: Ashwin Muppalla, Folsom, CA (US); Changliang Wang, Bellevue, WA (US); Penne Lee, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,488

(22) Filed: Jan. 31, 2022

(65) Prior Publication Data

US 2022/0156386 A1 May 19, 2022

Related U.S. Application Data

(63) Continuation of application No. 16/278,073, filed on Feb. 16, 2019, now Pat. No. 11,275,846.

(51) Int. Cl.
| | | |
|---|---|---|
| *H04L 29/06* | (2006.01) | |
| *G06F 21/60* | (2013.01) | |
| *G06T 1/20* | (2006.01) | |
| *G06N 3/04* | (2023.01) | |
| *H04L 9/08* | (2006.01) | |
| *G06N 3/08* | (2023.01) | |
| *G06F 16/23* | (2019.01) | |
| *G06T 7/00* | (2017.01) | |
| *G09C 5/00* | (2006.01) | |
| *H04L 9/06* | (2006.01) | |

(52) U.S. Cl.
CPC ........ *G06F 21/602* (2013.01); *G06F 16/2365* (2019.01); *G06N 3/04* (2013.01); *G06N 3/08* (2013.01); *G06T 1/20* (2013.01); *G06T 7/0002* (2013.01); *G09C 5/00* (2013.01); *H04L 9/0618* (2013.01); *H04L 9/0819* (2013.01); *H04L 2209/60* (2013.01)

(58) Field of Classification Search
CPC ..... G06F 21/602; G06F 16/2365; G06N 3/04; G06N 3/08; G06T 1/20; H04L 9/0819
USPC .......................................................... 380/200
See application file for complete search history.

(56) References Cited

U.S. PATENT DOCUMENTS

| | | | | |
|---|---|---|---|---|
| 8,443,077 B1 * | 5/2013 | Lappas | ................. | G06F 3/0619 |
| | | | | 709/224 |
| 2004/0174998 A1 * | 9/2004 | Youatt | .............. | H04N 21/23476 |
| | | | | 348/E7.056 |
| 2017/0169602 A1 * | 6/2017 | Blackmon | ............... | G06T 15/06 |

OTHER PUBLICATIONS

Notice of Allowance for U.S. Appl. No. 16/278,073, dated Nov. 12, 2021.

* cited by examiner

*Primary Examiner* — Evans Desrosiers
(74) *Attorney, Agent, or Firm* — Essential Patents Group, LLP

(57) ABSTRACT

Methods, articles, and systems of computer graphics processing system validation for processing of encrypted image content are disclosed herein.

25 Claims, 8 Drawing Sheets

FIG. 1
Scenario 1.

Encryption Key1
Decryption Key2

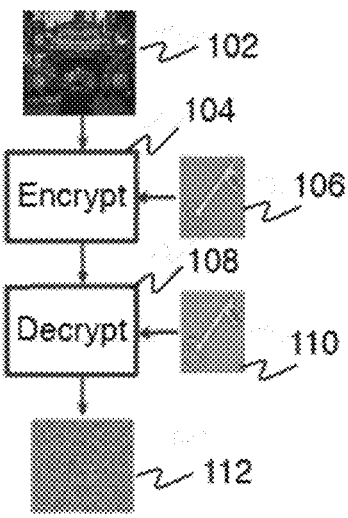

FIG. 2
Scenario 2.

No Encryption
Decryption Key2

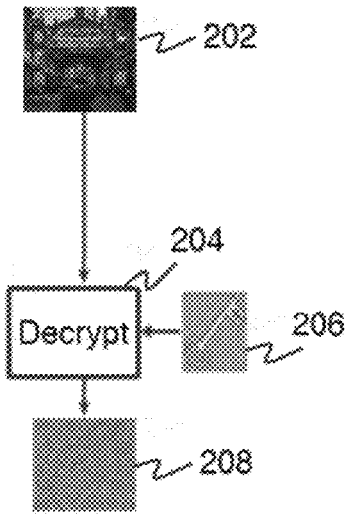

FIG. 3
Scenario 3.

Encryption Key1
No Decryption

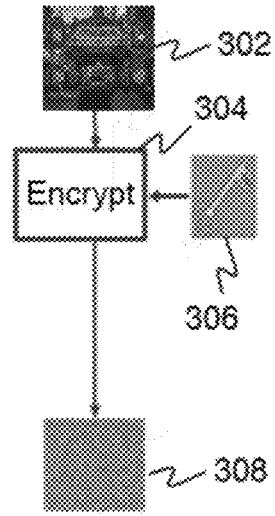

OBTAIN IMAGE DATA OF AT LEAST ONE IMAGE 402

↓

PERFORM GRAPHICS PROCESSING TO RENDER THE AT LEAST ONE IMAGE 404

↓

AUTOMATICALLY DETERMINE WHETHER THE IMAGE DATA INDICATES A POINT OF CORRUPTION IN THE GRAPHICS PROCESSING AND DETERMINED DURING OR AFTER THE GRAPHICS PROCESSING OF THE AT LEAST ONE IMAGE BUT BEFORE THE GRAPHICS PROCESSING OF A NEXT IMAGE, WHEREIN THE CORRUPTION IS AT LEAST PARTLY DUE TO OPERATIONS TO PROTECT CONTENT OF THE AT LEAST ONE IMAGE FROM UNAUTHORIZED ACCESS 406

↓

AUTOMATICALLY PERFORM A DEBUGGING-RELATED ACTION USING THE POINT OF CORRUPTION 408

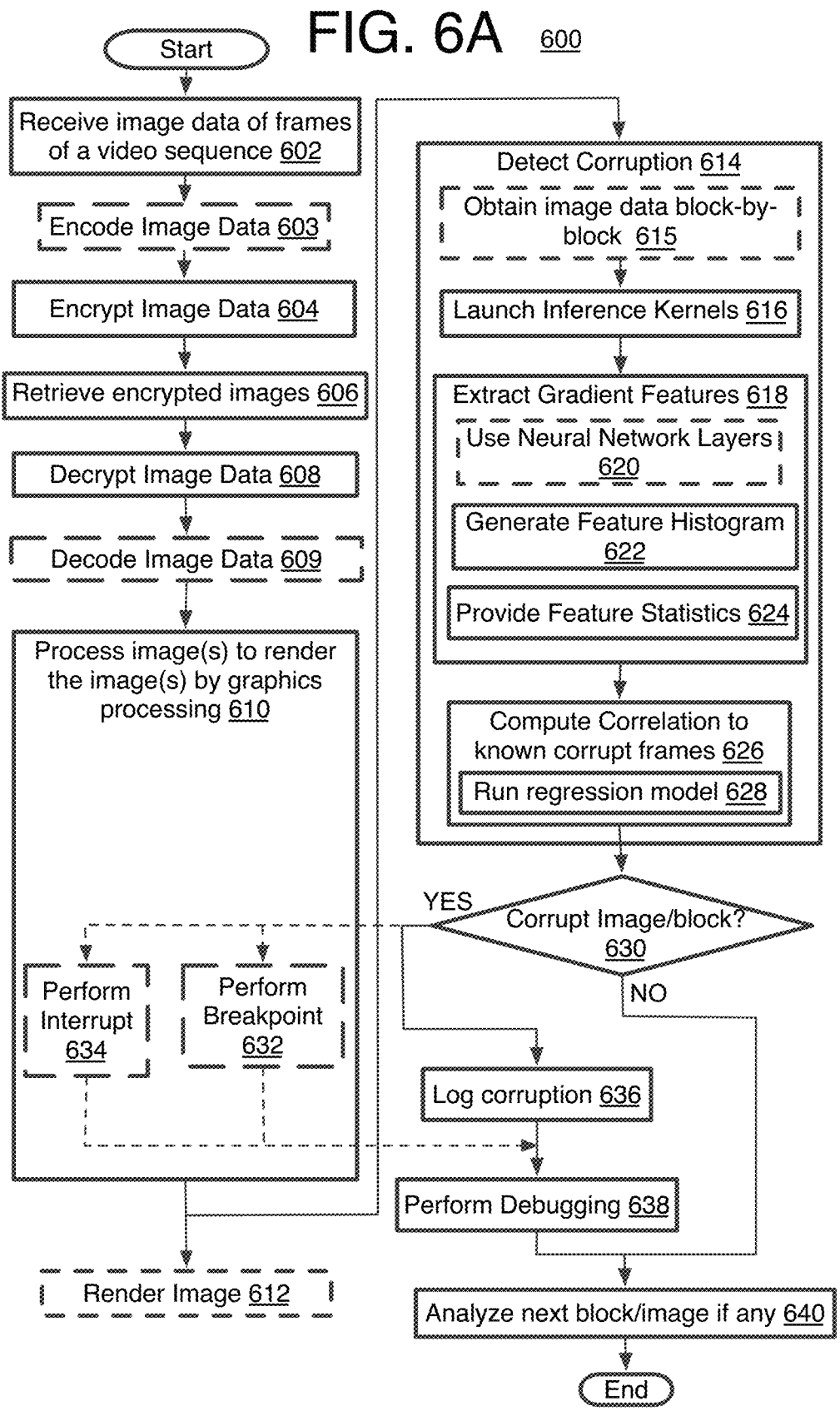

Original Image

Original Grad Orientation

704 Corruption

Corrupted Gradient Orientation

800

802

804

806

METHOD AND SYSTEM OF COMPUTER GRAPHICS PROCESSING SYSTEM VALIDATION FOR PROCESSING OF ENCRYPTED IMAGE CONTENT

CLAIM FOR PRIORITY

This application is a continuation of, and claims the benefit of priority to U.S. patent application Ser. No. 16/278,073, filed on Feb. 16, 2019, titled "METHOD AND SYSTEM OF COMPUTER GRAPHICS PROCESSING SYSTEM VALIDATION FOR PROCESSING OF ENCRYPTED IMAGE CONTENT", and which is incorporated by reference in its entirety for all purposes.

BACKGROUND

During testing and validation stages for graphics computer software and hardware, tests are performed to determine whether encrypted video (also referred to as protected content) can be properly decrypted and displayed by graphics components of a viewing device such as a computer, smartphone, or television. Such testing and validation usually includes determining whether encrypted data has been corrupted such that content of images or frames of a video sequence no longer properly show the content of the image but instead often show a snowy image or seemingly random patterns. When the reason for the corruption can be determined, the graphics program may be debugged by either modifying the code or adding new code to the graphics program to prevent the corruption of decrypted data.

It can be extremely difficult to find corruption of images with protected content when using conventional techniques such as having a person manually view a video on a display and log such corruption when viewed by the person, or with a reference-based technique that compares video being analyzed to pre-obtained good quality reference frames. The manual method results in a high error rate and inefficiency due to manual labor costs and human limitations. The reference-based method is not scalable since it is usually based on a limited number of reference images that do not represent a sufficient number of realistic scenes to adequately recognize a wide range of corruption types. The known techniques also are often too complicated to efficiently and accurately reproduce the corruption for analysis and debugging, thereby resulting in higher costs to do so, or lower performance encryption.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate the corresponding or analogous elements. In the figures:

FIGS. 1-3 are each a schematic flow diagram showing a scenario that causes corruption of encrypted video;

FIG. 4 is a flow chart of a method of computer graphics processing system validation for processing of encrypted image content according to at least one of the implementations herein;

FIG. 6A is a detailed flow chart of a method of computer graphics processing system validation for processing of encrypted image content according to at least one of the implementations herein;

DETAILED DESCRIPTION

Figure 5:
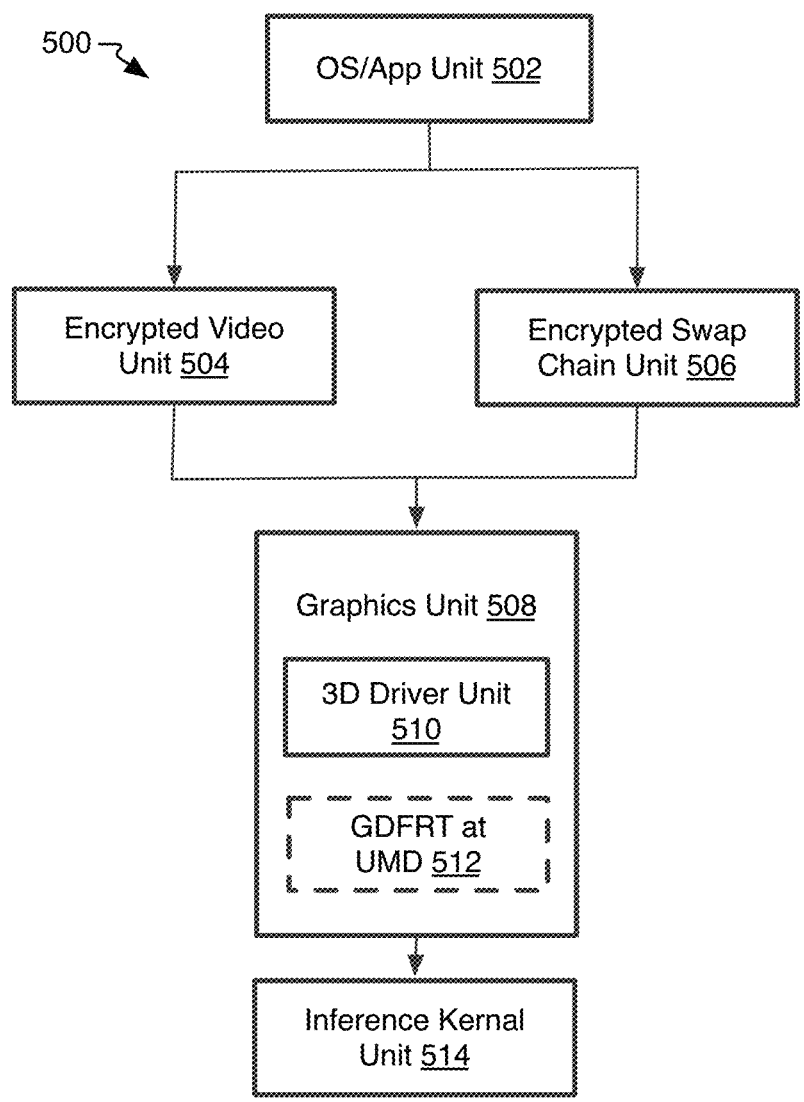
FIG. 5 is a schematic diagram of an image processing system used to perform a method of computer graphics processing system validation for processing of encrypted image content according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless specifically specified herein. For instance, various architectures employing, for example, multiple integrated circuit (IC) chips and/or packages, and/or various computing devices, commercial electronic and/or consumer electronic (CE) devices such as computers, servers, set top boxes, smart phones, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods are described below related to computer graphics processing system validation for processing of encrypted image content according to at least one of the implementations herein.

Referring to FIGS. 1-3, the transmission of data that requires encryption and then decryption of the data can result in a number of different corruption scenarios. As shown in FIG. 1, the typical data protection, exemplified for scenario or process 100 (also scenario 1), includes capturing or input of image data of an image 102, encryption 104 of the image and based on an encryption key 106, and then transmitting the encrypted image data which is received by a decryption device. The encrypted image data is then decrypted 108 by using a decryption key 110 that is the same as, or corresponds to, the encryption key 106. The decryption key is either already known to the decryption device or is transmitted from the encryption device to the decryption device along with the image data. In the case of scenario 1 (process 100), when both the encryption and decryption units have a key, a corrupted image 112 may result, here showing a snow pattern that does not properly show image content. This may result for a number of reasons even though both an encryption key and a decryption key are available. For instance, the system may have generated an incorrect key for either or both of the encryption unit or decryption unit, the wrong key may have been transmitted to the decryption unit, or one or more of the many layers of handshake that is involved during the key exchange has an error so that the key for decryption is corrupted. These can occur when data is lost during the transmission or during system transitions such as display topology changes that require re-initialization of the protection state.

Referring to FIG. 2, an example data protection process or scenario 200 (or scenario 2) demonstrates a situation in which image data received by the decryption unit was not encrypted even though the decryption unit is expecting encrypted data. The decryption unit may not detect that the received image data was not encrypted, and may attempt to decrypt the received image data anyway. So here, a non-encrypted image 202 is transmitted, and decryption 204 with a key 206 is attempted anyway resulting in a corrupted image 208 depicting an undesired snow or other pattern rather than the correct image content. By one example, this may occur when a decoding and decryption device has multiple modes and handles both encrypted and non-encrypted data and there is an error in the recognition of the protection on the received image data. Otherwise, this may occur because data is lost during encoding, transmission, or decoding of the image data. Also, a cause may be an error in the handshaking operations causing an error in the exchanging of the keys. In addition, a synchronization error may occur between switched videos being played when the decryption unit still believes it is analyzing a first video, when in fact, the first video was stopped and replaced with the playing of a second video. Other examples include when the encryption state is not propagated correctly to all components of the system.

Referring to FIG. 3, in a data protection process or scenario 300 (scenario 3), the image 302 may have been encrypted 304 with an encryption key 306 but no decryption took place, resulting in a corrupt image 308 with an undesired snow or other pattern. In this case, the decryption unit does not recognize the received data as being encrypted because data may be lost identifying the transmitted data as encrypted when there is an option to receive both encrypted and non-encrypted data at a decoder for example. Otherwise, it is possible that the system was enabling the playback of an encrypted content, but the setup of the system was incorrect and does not account for the encryption. In this case then, a decryption key also may not exist. System setup is accomplished as a combination of operating system (OS), Graphics Driver, and Hardware.

During the testing and validation of graphic driver software or hardware, the graphic driver may be tested to determine if any of these corruption scenarios occur during encryption and decryption which would lower the quality of the images or even make it impossible to view the images altogether. This is typically accomplished by playing a video, recognizing when corruption occurs on the video, attempting to reproduce that corruption during a debugging stage, and then perform adjustments to the code of the graphics driver to avoid the corruption. Debugging these issues, errors, and/or corruptions during a playback of the protected content can be very complicated both to reproduce the corruption and to determine the root cause of the corruption due to multiple layers of functionality spread across many components that can cause the corruption either alone or in combinations as mentioned with the three scenarios described above.

Also as mentioned, one conventional technique for determining when corruption occurs, especially for scenarios involving streaming of third party protected content (such as on Netflix® or Amazon Prime®, for example) but also for test content with very long runtimes is by manual visual inspection where a person views a monitor playing a test video previously processed and generated by the graphics driver being tested. Such tests may be run at a sufficiently slow speed so that a display is showing each image one image at a time, or one image at some set sample time interval, to the person viewing the images. The person performing the testing simply watches for a corrupted image showing a snow field or other undesired but recognizable pattern rather than the correct image content. Once the time of a corruption is noted, a system also may attempt to estimate the state of certain components on the graphics system at the time of the corruption and that are needed to determine the cause of the corruption. The corrupt frame is then analyzed by attempting to recognize the pattern on the corrupt frame so that the corruption can be recreated for debugging. This manual technique, however, is prone to numerous errors because the human performing this task can be distracted and miss corruptions on the screen. It also is inefficient because there is a limit to how long a person can perform this task without tiring such that having a single person perform the task may take a very long time, and whether a single person performs the task, or multiple people are used to reduce the completion time, the labor cost can be relatively high. The scenarios are then reproduced for debugging purposes, and this reproduction can be very tedious when the reproduction process takes a long time.

Another alternative is a conventional reference-based solution which involves generating a video sequence as controlled by the graphics driver. Then, for offline post-processing, the video sequence is automatically compared to reference frames from a golden output that is expected, where the same key is known and matching for encryption and decryption. The reference frames have known and desired grading of the image data (or in other words, gradients of chroma or luminance image data) to indicate desired normal image content. When the difference in gradation between the generated video sequence and the reference frames is a certain amount and direction, this may indicate a specific type of corruption. This technique, however, is not scalable because it requires the use of the same content as the golden reference in order to perform the detection comparisons. Particularly, the gradation pattern changes significantly depending on the scene, and the number of scenes pre-profiled to form the golden reference frames is always insufficient compared to the number of real-world scenes that could be used. Thus, this technique cannot be used to test third party streaming use cases, which are a significant portion of graphics use cases, because it is not possible to have golden reference content to compare against. In other words, all comparison reference content for this technique must be predetermined and pre-processed. Thus, this technique is often inadequate to ensure robust validation of a graphics platform.

In either of these techniques, it is very difficult to accurately reproduce the corruption for debugging because of the many varieties of component combinations that could cause a corruption within the graphics software itself or as caused by the hardware of the video adaptor or a combination of both. For example, these corruptions are often sporadic in nature, i.e., the timing of the corruption itself is not reproducible since the corruption or failure can occur at different points in time during the same exact repeated test. Therefore, trying to reproduce the failures seen in a first or multiple runs can be a challenge. Also, since the detection of the corruption occurs after the generation of the entire video sequence with the manual and reference techniques described above and as controlled by the graphics driver, these systems do not have the ability to accurately reproduce or freeze exact conditions that caused the corruption in the first place.

To resolve these issues, the present method and system are able to automatically determine a point of corruption while a graphics system, including the graphics driver, is processing a video sequence of images that were protected by encryption for example. In other words, this solution provides real time non-reference graphics driver breakpoint capability at the point of corruption during the playback of protected content in graphics platform validation. This can be achieved because it has been determined that the image data features, such as gradients as one example, of the patterns formed or displayed on corrupted images indicate specific types of corruption.

Specifically, the proposed solution obtains an encrypted video frame, decrypts the frame, and launches an inference kernel built to extract image features, such as gradients to name one example, while the graphics driver is separately processing the decrypted frames to render the frames. The inference kernel then may input the image features to a machine learning model, such as a logistic regression model, that can determine whether or not a decrypted frame is corrupted by comparing the gradation of the decrypted frame to gradation of known corruptions. The regression model is trained based on image parameters including gradations extracted from corrupted frames and that represent, or correlate to, known protected content corruption artifacts. Once the point of corruption is determined in real-time, a breakpoint may be triggered to perform immediate debugging either by pausing the processing of the graphics driver while the same frame is being analyzed for corruption, or just after the graphics driver has completed the processing of the corrupt frame and before starting analysis of the next frame. Otherwise, the inference kernel may perform an interrupt initiated to download the state of the computer at the time of the corruption to aid with debugging to be performed later. In either case, the analysis by the regression model recognizing the corruption may be logged by the application performing the recognition.

This ability to not only detect the presence of corruption in real-time but also to interrupt or breakpoint the driver at the point of corruption (either during the processing of the frame being analyzed or just after the completion of the processing of the single frame by the graphics driver) is advantageous. Particularly, this capability to breakpoint the graphics driver at the occurrence of the first detection of a corruption saves valuable time in reproducing the event, and this benefit is even more significant if the failure is sporadic (and corruption of protected content playback tends to be sporadic). The solution herein better ensures high quality images and the potential discovery of many more issues in the graphics drivers immediately during the testing and validity stage, before a product is sold, versus that of the conventional techniques.

Thus, another way to describe the system and method is to state that the implementation of the disclosed system uses a very low footprint without the need of a reference to breakpoint the software component, such as the graphics driver, at the point of visual corruption during the playback of protected content. Each protected content frame is processed by a specifically developed software kernel that detects malfunctioning of the graphics system that is due to the encryption and decryption of the frame.

It will be understood that the term encryption herein is meant in general terms and does not refer to any specific type or technique of encryption unless the context indicates otherwise.

Referring now to FIG. 4, an example process 400 may provide a computer-implemented method of computer graphics processing system validation for processing of encrypted image content according to at least one of the implementations herein. In the illustrated implementation, process 400 may include one or more operations, functions or actions as illustrated by one or more of operations 402 to 408 numbered evenly. By way of non-limiting example, process 400 may be described herein with reference to operations discussed with regard to example systems 500, 900, 1000, or 1100 discussed below.

Process 400 may include "obtain image data of at least one image" 402. The images for graphics processing validation may be obtained from a memory. The images may be pre-processed sufficiently for such validation operations including encryption, decryption, and rendering, and when so performed, for encoding and decoding as well. The images may be one or more single still photos (or frames) or frames of a video sequence. This operation also may refer to obtaining the image data after images or frames were encoded, encrypted, decrypted, and then decoded so that the images are ready for rendering graphics processing such as by a graphics driver for example. By an alternative form, the image data was not encoded and decoded, and encrypted data was decrypted directly from encryption, and then provided for corruption detection.

Process 400 may include "perform graphics processing to render the at least one image" 404. Here, this operation includes performing graphics processing to display the images, whether or not the images are actually displayed. Thus, the images are processed at least as if the images are to be displayed. This operation may involve color space conversions, scaling, image enhancements, blending with other planes, 3D rendering, flipping buffers to perform the display, and so forth. Herein, at least software, hardware, firmware, or any combination thereof is considered forming the graphics driver, or part thereof, when it performs one or more of these tasks of preparing the frame for display.

Process 400 may include "automatically determine whether the image data indicates a point of corruption in the graphics processing and determined during or after the graphics processing of the at least one image but before the graphics processing of a next consecutive image, wherein the corruption is at least partly due to operations to protect content of the at least one image from unauthorized access" 406. This operation may include the use of normal original image data that does not initially have any known encryption-related corruption. By a first form, the image data is only obtained for corruption detection after the graphics driver completed processing for rendering of the single image so that the image data is in condition for display by having resolution and format compatible for display for example, and otherwise having data for the frame ready to display the intended content (or scene in the frame). Only then is the image data obtained for a frame for corruption analysis. By a second option, a decrypted and/or decoded frame of image data is processed simultaneously for both rendering operations and corruption detection by an inference kernel that is launched upon receipt of the image by the graphics driver. By a third form, the image data is obtained from memory or registers after the rendering units of the graphics driver performs at least some tasks, such as color space conversion or 3D rendering tasks, and so forth, but not all rendering tasks, before corruption detection is performed. In this case, the image data may be obtained for detection once a certain task is complete rather than obtaining the image data in the middle of performing a single task so that the image data is at least set for the entire frame for that task (or unit to be analyzed for detection when less than an entire frame). Any of these options are performed without the need of obtaining reference image data to compare to the at least one image to make the determination.

In any of these cases, the inference kernel may process image data on a block-by-block (or rectangle by rectangle) basis rather than the entire frame at once. In this case, 256×256, 128×128, or 64×64 pixel blocks or rectangles of data may be processed one at a time. This attempts to minimize the overhead caused by running the corruption detection kernels during real time end-to-end scenarios. By one example, when at least one of these blocks is corrupt, then the frame is considered corrupt. In other options, when a certain number of the blocks are corrupt, the frame or image is considered corrupt sufficiently for analysis such as a majority or other number of blocks.

In order to perform the corruption analysis, as mentioned herein, a launched inference kernel may perform feature extraction, and particularly extracting image data to determine the gradients of the image data on the block or image. The gradients are then input to a regression model to compare the gradients to gradients that represent known corrupted images. This is accomplished by using machine learning, and specifically by pre-training the regression model. By one form, this is accomplished by using a polynomial equation with coefficients set to represent the corruption. A different equation may be provided depending on the type of corruption to be detected and depending on the type of data set to be used as explained below. The coefficients are determined by training the regression model based on a number of images that are known to be corrupt for various reasons, and therefore, have been found to have distinct and recognizable image data gradient patterns. The output corruption determination may be a binary decision indicating that the frame, or block, is corrupt or not.

Process 400 may include "automatically perform a debugging-related action using the point of corruption" 408, which may include options such as conducting a breakpoint, interrupt, and/or logging of the corruption analysis. Thus, when no corruption is indicated, the graphics driver will continue processing the current frame or obtain a next frame of a video sequence while in correspondence, the inference kernel analyzes the next block of the current frame or next frame corresponding to the image data being processed for rendering. However, when corruption is detected, then the inference kernel may initiate a break point so that manual or automatic debugging can be performed as immediately as possible and based on the analysis of the current frame being rendered, and before the graphics driver can move to the next frame which loses data that indicates the state of the system. When manual, a user may be notified of a corrupt frame, the graphics driver is stopped, and the user may initiate a debugging program or session right away before continuing graphics processing and corruption detection of the remainder of a current frame or the next frame. By an alternative, such corruption indication will issue a breakpoint and then automatically start a debugging program without human actions needed. In either case, the breakpoint may occur either during the graphics processing of a current frame found to be corrupt or after the processing of the current frame is complete but before a next frame is obtained for rendering.

Whether or not a breakpoint was performed, an interrupt also may be performed that saves data that indicates the state of the computer or system at the time of the corruption. This may dump memory and register data for example and for the debugging analysis. When the interrupt is performed, the state of the system is saved so that the debugging can be performed after the graphics driver is done with processing a video sequence and at more desirable times.

The system also may perform a logging of the determination of corruption and also may log a state of the system such as registers, command buffers, memory dumps, information regarding the operations performed and other useful debugging information. The logging of the detected corruption decision may be performed, and triggered, once the corruption is detected but before the next frame is processed so that the logging is performed in real time. The logging can be used more often for automated runs to report pass/fail versus the frequency of the reports for live debugging, and therefore is convenient to use whether or not a breakpoint is being performed. An interrupt may be used to facilitate the logging but is not always required.

Referring now to FIG. 5, one specific example image processing system 500 is arranged in accordance with at least some implementations of the present disclosure. In general, system 500 may operate a computer-implemented method of computer graphics processing system validation for processing of encrypted image content according to at least one of the implementations herein.

System 500 may include an OS/App unit 502, which includes an operating system with a desktop windows manager (DWM), or other desktop compositor application for example that communicates between user interfaces, applications that use image data, and so forth. The OS unit 502 may provide received and encrypted image data to an encrypted video unit 504 that handles encryption tasks such as by obtaining a decryption key and decrypted received image data. An encrypted swap chain unit 506 handles received image data that is to be rendered by using multiple buffers such as alternating front and back buffers. Such encryption swap chain unit 506 handles the encryption at a timing synchronized with the uploading and processing of image data from the buffers.

Thereafter, the image data then may be provided to a graphics unit (or graphics driver or graphics driver unit) 508. The graphics unit 508 may be loaded, if not loaded already, to perform rendering processing tasks and to launch the inference (or corruption detection) kernel. The graphics driver may be, or have, a 3D, media, or display driver, to name a few examples. Specifically, the graphics unit 508 may be, or may have, a 3D graphics driver 510 that in this example may be used to perform 3D analysis such as constructing a depth map if not already provided, 3D models, and so forth often used for computer-based games or other 3D environments. Such 3D driver may have DirectX graphics infrastructure using DXGI commands or function calls (BiltDXGI, PresentDXGI, and MPOPresentDXGI to name a few examples).

The graphics unit 508 also may have a graphics driver front (GDFRT) 512 operated by using user mode display/graphics driver (UMD) due to the convenience of this level of operation but kernel mode could be used instead. By using the user mode driver, the operating system (in this example case, Windows) can more easily identify the final composited render targeted to be displayed because user mode driver entry points exist, referred to as present points, that will indicate rendering processing for the frame is complete and that it is time to present the frame. When the present point exists, the OS informs the graphics driver that a frame is ready for display. Functionality can be added in the graphics driver to intercept at all three user mode display/graphics driver (UMD) present points in the 3D Driver.

An inference (or corruption detection) kernel unit 514 can be launched by the graphics unit 508 in order to perform the corruption detection while the graphics unit 508 performs processing to render a current image being analyzed, and to stop the graphics processing and initiate and perform a debugging-related action, such as a breakpoint, interrupt, and/or log of the corruption detection. The details are provided with process 600.

Figure 6B:
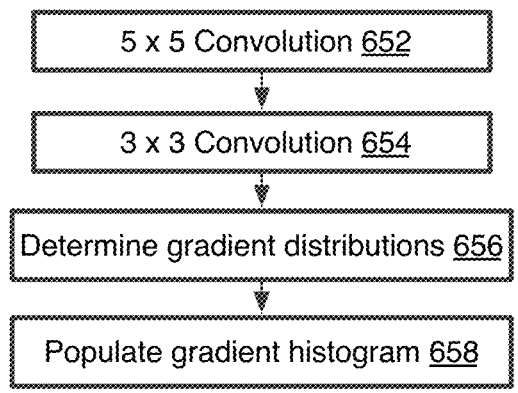
FIG. 6B is a flow chart for feature extraction operations of the method of FIG. 6A.
Figure 7A:
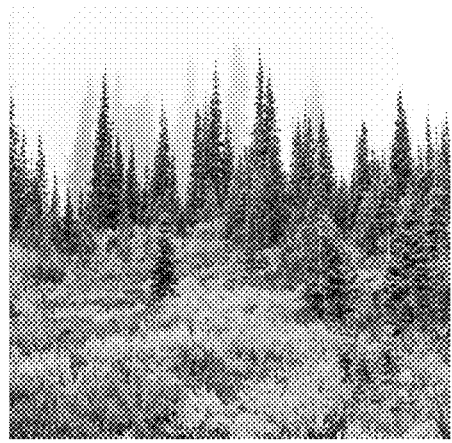
FIGS. 7A-7D are example non-corrupted and corrupted images and gradient patterns.
Figure 7B:
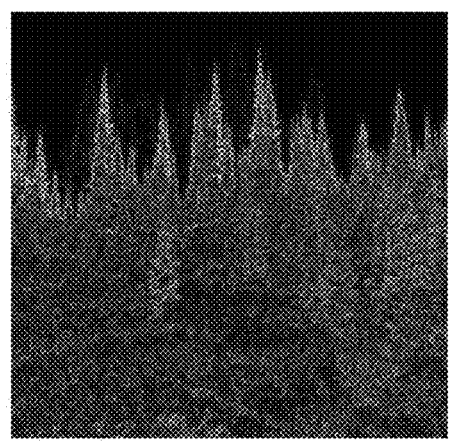
Figure 7C:
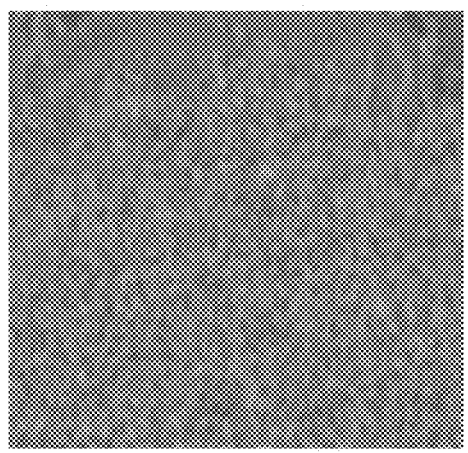
Figure 7D:
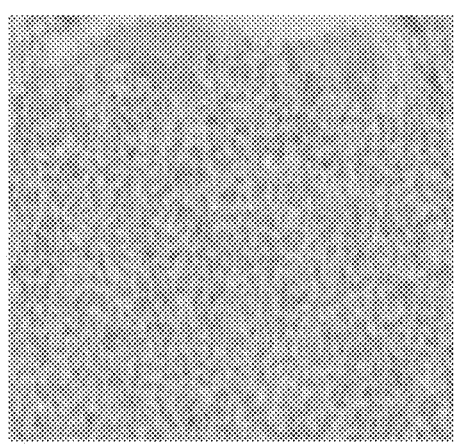
Figure 8A:
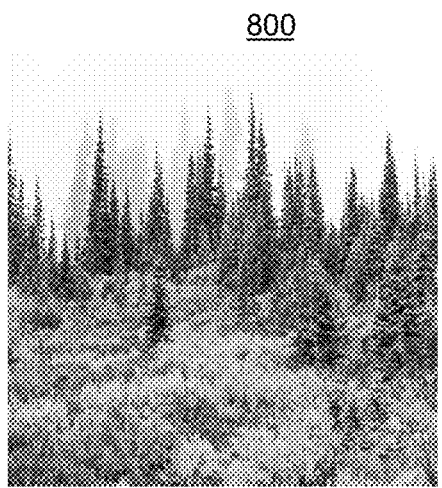
FIGS. 8A-8D are example non-corrupted and corrupted images and gradient patterns.
Figure 8B:
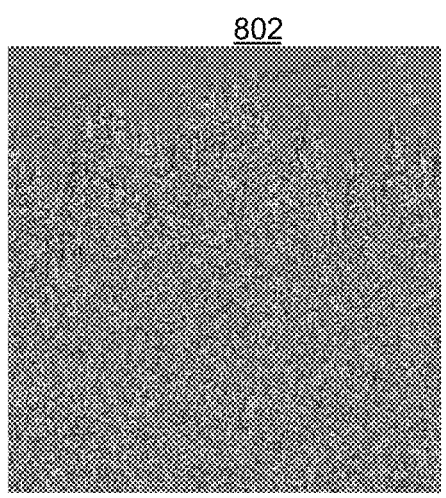
Figure 8C:
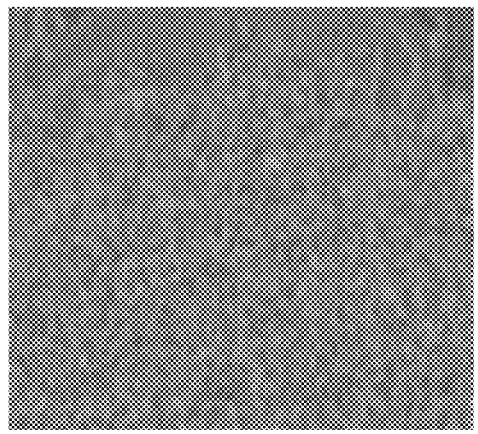
Figure 8D:
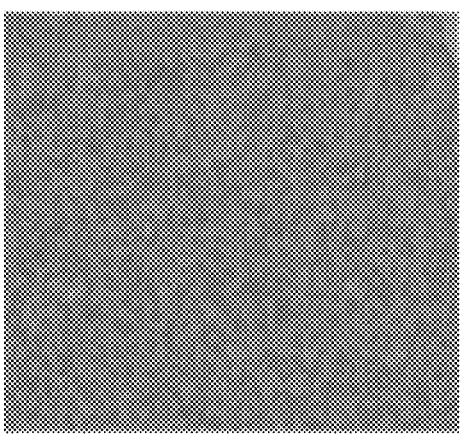

Referring now to FIGS. 6A-6B, an example process 600 is arranged in accordance with at least some implementations of the present disclosure. In general, process 600 may provide a computer-implemented method of computer graphics processing system validation for processing of encrypted image content according to at least one of the implementations herein. In the illustrated implementation, process 600 may include one or more operations, functions or actions as illustrated by one or more of operations 602 to 640 generally numbered evenly. By way of non-limiting example, process 600 may be described herein with reference to operations discussed with regard to example systems 500, 900, 1000, or 1100 discussed below.

Process 600 may include "receive image data of frames of a video sequence" 602, and as discussed above, this may include obtaining images stored in a memory, and when needed, pre-processing those images sufficiently for encryption, coding, and validation operations performed herein. By one form, once pre-processed, process 600 may include "encode image data" 603, by one of many known encoding standards for video and images, such as H.264, high efficiency video coding (HEVC), and so forth. It will be appreciated that the corruption detection described herein also could be used without encoding and decoding the images, and directly decrypting the image data after encrypting it instead.

Once the images are encoded, process 600 may include "encrypt image data" 604, and this may be performed by using any known encryption process such as symmetric key or public key encryption techniques and specifically, a serpent encryption technique, advanced encryption standard 128 (AES-128), or AES 256 encryption to name a few examples.

Once encrypted, the encrypted data may or may not be transmitted to another device for decryption depending on whether or not it is desirable to have artifacts in the encrypted data caused by transmission errors to be detected. When such errors are not a concern, the same single device may perform both the encryption and decryption. Otherwise, when such transmission related errors are being detected, then a separate decryption device may be used that communicates with the encryption device over a computer and/or telecommunications network whether a local or wide area network (LAN or WAN) using wireless communication such as Wi-Fi or the internet, by wired connection such as ethernet cable, or any other known data transmitting network. In any of these cases, process 600 next may include "retrieve encrypted images" 606, which may involve providing access to the stored encrypted images in a memory, and on, or accessible to, the decryption device.

Process 600 then may include "decrypt image data" 608, where a first or next retrieved frame is decrypted with an ideally correct key, and according to the encryption techniques described above. The decryption key may be received as transmitted or saved from the encryption device (if created by the encryption device) or otherwise known to the decryption unit. This may include an integrated encryption and decryption where encryption is performed with every write, and decryption is performed on every read.

Process 600 may include "decode image data" 609, where the decrypted images are then decoded also according to the coding standards mentioned above. This operation also may involve any post-processing operations such as color space conversions, scale conversions, and so forth that is not considered part of the rendering tasks by the graphics driver so that the result is decrypted and decoded images or frames ready for rendering processing.

Process 600 may include "process image(s) to render the image(s) by graphics processing" 610, and as mentioned above, the graphics driver may retrieve frames from a decoding output buffer for example, or from swap chain buffers, to process the image data for rendering. This may include color space conversions, scaling, image enhancements, blending with other planes, 3D rendering which in one form is performed in order to generate back buffer content as required and that fits the display requirements, buffer flipping, and so forth.

Process 600 may include the option to "render image" 612. Thus, for validation, actual rendering is not necessary as long as the graphics driver is performing the operations that generate image data that actually could be used to provide to a display unit, or device with a display screen to actually display the images. Otherwise, when the image processing system actually has a display, the images may be rendered if desired, where the images are passed to local frame buffers at the display and then displayed.

During or after these rendering operations 610, process 600 may include "detect corruption" 614. First for this task, process 600 may include "obtain image data block by block" 615. As mentioned above, the inference kernel may process image data on a block-by-block (or rectangle by rectangle) basis rather than the entire frame at once. In this case, 256×256, 128×128, or 64×64 pixel blocks or rectangles of data may be processed one at a time. This attempts to minimize the computational load overhead caused by running the inference kernels during real time end-to-end graphics processing scenarios. A block here may be rectangular but need not always be so, and any shape for processing may be used such as a few (three) lines across an image by one example that could be used to obtain Sobel-type gradients that uses 3×3 filters to compute gradients.

The obtaining of the blocks of image data for corruption detection may be considered an operation of intercepting the image data from the graphics driver rendering operations. Also as described above, the image data obtained for corruption detection may be the same image data output after rendering processing and where a frame is ready to be displayed as shown on process 600. Such frame may be obtained from a frame buffer for rendering for example. Otherwise, the image data may be obtained before rendering processing and from a frame buffer holding image data for input to the graphics driver, or after a specific rendering operation performed on a current image or frame being analyzed for example. In this case, once color space conversions, scaling, image enhancements, blending with other planes, 3D rendering are complete, then the blocks of image data can be obtained, or it can be obtained after any of these tasks are complete.

Process 600 may include "launch inference kernels" 616, where the graphics driver or other module launches an inference kernel to perform the corruption detection. The launching of the kernel is performed by loading inference kernel programs into graphics memory and instructing the GPU to execute them or accessing an inference kernel set in firmware. The graphics driver then submits intercepted frames to the graphics inference kernels for feature extraction and then inference output from the regression model. Accordingly for clarity, it will be understood that herein the inference kernel is considered a single, distinct entity (or module, unit, application, or program) that performs a number of corruption detection tasks even though each of the stages mentioned herein may be considered a separate kernel (or sub-kernel) or software program that runs on a programmable GPU core (that runs a shader program for example that is one of the main applications of the graphics driver and that may perform shading for 3D points and many other graphics and rendering tasks). This may include kernels (or sub-kernels) of feature extraction, correlation (or detection), performing breakpoints, performing interruptions, and logging detection results. On a more detailed level, the inference kernel may include sub-kernels of the feature extraction and correlation including performing two neural network layers, generating a gradient histogram, and then running a regression model to form a corruption determination all described in detail below. Thus, for implementation herein, the inference kernel may be considered a compilation of the sub-kernels into a single kernel binary (binary code that is considered a single program or application) which makes loading and submitting of the inference kernel to hardware more efficient.

Process 600 may include "extract gradient features" 618, and as mentioned, corruption of different types will have different image data gradient patterns and these patterns are measurably different than patterns of normal images. By one form, this involves analyzing the image data block by block, and first extracting the gradients of the image data of the block.

Referring to FIG. 6B, while various techniques may be used to compute the gradients of the block, by one form process 600 includes "use neural network layers" 620, and here two neural network layers are used without any other layers, and in this example, two convolutional layers. By one approach, the first convolutional layer 652 uses 5×5 filters while the second convolutional layer 654 uses 3×3 filters. As an alternative, the convolutional layers can be 7×7 and 5×5 respectively. The layers 652 and 654 are single channel layers that can be trained on brightness (or luminance) values. As an alternative, the layers could be three channels and use RGB color space pixel values. Filters may be used that each indicate a likelihood of a different gradient direction such as horizontal, vertical, and two opposite diagonals. The filters may be Gaussian filters. The weights of 5×5 filters are as follows:

Filters Used in the Convolution of the Horizontal Data:

| −0.0000178139, | −0.0001140966, | 0.0001140966, | 0.0000178139, | 0.0000000443, |
|---|---|---|---|---|
| −0.0071866230, | −0.0460298343, | 0.0460298343, | 0.0071866230, | 0.0000178573 |
| −0.0531023608, | −0.340117028, | 0.340117028, | 0.0531023608, | 0.0001319487 |
| −0.0071866230, | −0.0460298343, | 0.0460298343, | 0.0071866230, | 0.0000178573 |
| −0.0000178139, | −0.0001140966, | 0.0001140966, | 0.0000178139, | 0.0000000443, |

Filters Used in the Convolution of the Vertical Data:

| −0.0000178139, | −0.0071866230, | −0.0531023608, | −0.0071866230, | −0.0000178139, |
|---|---|---|---|---|
| −0.0001140966, | −0.0460298343, | −0.340117028, | −0.0460298343, | −0.0001140966, |
| 0.0001140966, | 0.0460298343, | 0.340117028, | 0.0460298343 | 0.0001140966, |
| 0.0000178139, | 0.0071866230, | 0.0531023608, | 0.0071866230, | 0.0000178139, |
| 0.0000000443, | 0.0000178573 | 0.0001319487 | 0.0000178573 | 0.0000000443, |

The Symmetrical 3×3 Averaging Filter Coefficients are:

| 0.1111, | 0.1111, | 0.1111, |
|---------|---------|---------|
| 0.1111, | 0.1111, | 0.1111, |
| 0.1111, | 0.1111, | 0.1111  |

It will be noted that in this example, no supporting layers are used such as bottleneck, rectified linear unit (ReLU), and pooling layers to name a few examples. The simple two layers of neural networks are sufficient because the signature of the corruption visible during the protected content playback can be represented as a non-linear equation of three dimensions. This permits the system to compute the variables for each incoming frame and check for the occurrence of the corruption without adding significant computational overhead.

By one example, the output of the neural network is a distribution of gradients where each gradient corresponds to a pair of pixel locations. By another example, the output of the neural network is a compressed feature map of the image data of a block that is used as input to gradient computation equations to compute gradient magnitudes and gradient intensities.

The neural network is trained by inputting images with known gradients into a supervised network. Also, the gradient parameters for the training dataset is extracted, and the extracted parameters are fit into a regression model of three dimensions. An example equation of the regression model is equation (3) below and is used in the driver kernel to determine whether or not a frame from the protected content playback is corrupt.

By one alternative, once the gradient distributions are obtained from the neural network, the feature extraction may include "generate feature histogram" 622, and this may involve "determine the gradient distributions" 656 (FIG. 6B). When the neural network layers output gradient values, this option simply refers to obtaining the gradient distributions from the neural network.

By another alternative, operation 656 includes obtaining an output feature map for a block from the neural network and subsequently performing magnitude and gradient computations to obtain those gradient parameters for each pixel location in the block being analyzed. Such computations may be Sobel-type window computations for example.

With either use of the neural network, process 600 may include "populate gradient histogram" 658 and by using the generated gradient distributions. A gradient histogram may be generated separately for each single block, or the gradient distribution from each block may be added to the same histogram to form a single histogram for the entire frame before it is input to the regression model for corruption detection.

Process 600 may include "provide feature statistics" 624, to provide the histogram for correlation of the input blocks (or frame) to corrupt images, and therefore, process 600 may include "compute correlation to known corrupt frames" 626. This may be performed by running 628 a regression model that is trained on corrupt images.

Particularly, the corruption detection mechanism exploits the strong correlation between gradient features of pixels and presence of corruption in the frame. This correlation is configured (learned) in a logistic regression over a database of training content (images) with the corruption. The magnitude and orientation of the gradient features are used to differentiate between corrupted and non-corrupted images, where magnitude is a measure of the change in the intensity of the image, whereas the orientation indicates the direction of the intensity change. Gradient magnitude difference between a corrupted and non-corrupted frame can be written as:

$$\|\nabla f\| = \sqrt{\left(\frac{\partial f}{\partial x}\right)^2 + \left(\frac{\partial f}{\partial y}\right)^2} \quad (1)$$

while gradient orientation difference between corrupted and non-corrupted frame can be written as:

$$\theta = \tan^{-1}\left(\frac{\partial f}{\partial y} \bigg/ \frac{\partial f}{\partial x}\right) \quad (2)$$

where f is a gradient, and x and y refer to the derivatives.

By one form, the regression model is a logistic polynomial equation with coefficients that indicate the correlation between input image gradients and the gradients of the corrupted images. Once such equation is stated as:

$$W1 * X1 + W2 * X2 + W3 * X3 + B >= \text{threshold} \quad (3)$$

where W=Weights, X1=Gradient parameters extracted from the images, B=Bias of the regression equation, and Threshold=value for making the decision as to whether or not corruption is present. W1, B and threshold are obtained from the training. X1, X2, X3 are the gradient parameters extracted from the frames to be analyzed for corruption. In one example, where by one example W1=100.2278; W2=405.1544; W3=−822.6311; B=6.4167; and threshold=0.71, In order to compute the coefficients for the regression model during training of the regression model, by one example, a toolkit may be used to generate both good and corrupted images of all three corruption scenarios 100, 200, and 300 (FIGS. 1-3). In one test described below, open secure sockets layer (OpenSSL) toolkit was used, and to generate 2832 images with known gradients and for all three corruption scenarios including 70% training images to 30% test images.

The training of the regression model is performed by using the image gradients to compute the coefficients. Once the image gradients are extracted from the images. The image gradients are used to fit a non-linear equation using a regression model. This curve fitting will result in the weights and bias for the equation, which is then plotted to identify the threshold that can be used to differentiate between a corrupted and non-corrupted image. By one approach, one equation is used and trained on a variety of types of corruption including the three scenarios mentioned above. By an alternative approach, the corruption may be divided by causes or other classification, and an equation may be determined for each desired class of corruption.

Referring to FIGS. 7A-7D, an original image 700 with a corresponding gradient image or map 702 shows original gradient orientations of the image data forming the gradient map 702. A corrupted image 704 has an example corresponding corrupted gradient image or map 706 showing very different gradient orientations of the corrupted image 704.

Referring to FIGS. 8A-8D, an original image 800 with a corresponding image 802 shows original gradient orientations of the image data forming the image 802. A corrupted image 804 has an example corresponding corrupted gradient image or map 806 showing very different gradient orientations of the corrupted image 804.

After the regression model is trained and ready for graphics processing testing, process 600 may include "run regression model" 628, where the extracted gradient features are input to one or more of the logistic regression polynomial equation (3) to generate the inference output. The regression model may be operated by the graphics driver, and performed by the inference kernel in real-time as the same current frame or image is being analyzed and processed for rendering by the graphics driver as already described above.

The equation (or each version of the equation) may be applied to a gradient histogram of each block individually, or a single compiled gradient histogram for an entire frame (or image). When the block by block corruption correlation analysis is being performed, the entire frame may be considered corrupt when one of the blocks of a frame is found to be corrupt. Otherwise, the frame may be found to be corrupt when some certain number of corrupt blocks passes a corruption threshold such as a majority of the blocks, or other number of blocks that is considered meaningful to declare a frame corrupt. Otherwise, the regression model may simply find a frame is corrupt or not when the gradient histogram input represents the entire frame.

Accordingly, process 600 then may include the inquiry "corrupt image/block?" 630. The output of the logistic regression model is binary i.e., 0 for a normal frame with no corruption, or 1 for a bad frame with detected corruption. Depending on the output corruption inference (1: Corruption, 0: No Corruption), the inference kernel can then breakpoint and/or interrupt the graphics processing being performed by the graphics driver as follows.

When the frame is found to be corrupt, process 600 may include "perform breakpoint" 632. Specifically, when the corruption is detected, a breakpoint can be initiated and performed immediately to stop the graphics processing. Immediately here refers to the next time point that a breakpoint is permitted after the time point a corruption determination is made. The user (or validation engineer), or automatically triggered debugging application, then can start to debug the system and attempt to determine what caused the corruption without waiting for the analysis of an entire video sequence, or even without waiting for the graphics processing of the current frame for rendering is completed, since waiting in either case will cause data indicating the state of the system to be lost, which in turn loses information that indicates the cause of the corruption. Generally, this may be stated as stopping, by performing a breakpoint, the rendering processing of the graphics driver so that debugging can be performed to capture the state of the system including the graphics driver and both the code being performed and the data input to the driver, before continuing the graphics rendering.

With regard to the timing of the breakpoint in particular, the following are example time points when a breakpoint can be performed, listed with various levels of specificity:

(1) While the graphics driver is issuing commands or before or after image data is transmitted to or from GPU hardware that performs rendering tasks applied to the image data. Such tasks are mentioned next in (2).

(2) After one or more graphic processing rendering tasks are performed by the graphics driver but before a next task is started. Such tasks may include for example color space conversions, pixel color adjustments, scaling, image enhancements, blending with other planes, 3D rendering, buffer flipping, and so forth as already mentioned above.

(3) While a rendering task is being performed but before the task is complete such as for any of these tasks mentioned here or others performed by the graphics driver. This option would be more complicated and not as practical, however, because this would require triggering validation of the rendering (i.e. execution of the corruption detection kernels) in parallel to the rendering being performed instead of after the fact.

(4) From the perspective of the hardware, after GPU hardware has completed processing a block of image data or a plane's worth of image data, and before the GPU processes a next block or plane's worth of image data, whether between a current and next frame, or for the same frame.

(5) After current frame graphics processing by the graphics driver for rendering is complete but before a next frame is started. Particularly, the breakpoint may occur at least before all rendering planes (which are memory objects with one or more buffers) holding data for input to the GPU hardware is emptied to receive data of a next frame. In one possible activation, the breakpoint may occur when the image data from all rendering planes for a current frame is complete and before planes, and by one form any rendering plane, are reset for the next frame. This is used for examples herein.

Sample pseudo code to perform the breakpoints may be as follows:

```
// Issue the inference kernels and wait for them to complete.
    CHECK_STATUS_RETURN(event->WaitForTaskFinished( )); // Default timeout is
2s.
    CHECK_STATUS_RETURN(event->GetStatus(status));
    CHECK_STATUS_RETURN(!(status == STATUS_FINISHED));
CHECK_STATUS_RETURN(event->GetExecutionTime(executionTime));
// Read the surface that has the output of the inference kernel.
CHECK_STATUS_RETURN(m_decision->ReadSurface((uint8_t *)&dstDecision, event,
4*sizeof(uint32_t)));
    // Result is placed in dstDecision[2] location.
    if (dstDecision[2] == 0)
    {
        // where 0 indicates not corrupt, and continue execution.
        sprintf_s(dbgString, "Execution Time: %0.2fms, Corrupted? No! \n",
executionTime / 1000000.0);
    }
    else
    {
        // where 1 (or non-zero) indicates frame is corrupt, issue a driver breakpoint so that
user can debug.
```

```
    sprintf_s(dbgString, "Execution Time: %0.2fms, Corrupted? Yes! \n",
executionTime / 1000000.0);
      debugbreak( );
    }
// Alternatively, dump out the message to the debug output window for validation to inspect.
OutputDebugStringA(dbgString);
``` where dstDecision is the surface that contains the output decision (true or false) from the inference kernel, and the driver is waiting for the execution of the inference kernel to complete before reading this surface to determine the result. The driver will then decide whether to issue a breakpoint.

Also when the frame is found to be corrupt, process 600 may include "perform interrupt" 634 and either instead of, or in addition to, the breakpoint. Specifically, an interrupt may be used to run one or more routines that capture the state or condition of the computing system or computer performing the graphics processing and corruption detection. Thus, once corruption is detected, the inference kernel operated by the graphics driver can issue an interrupt to a kernel mode or user mode driver, which could then dump important processor and/or GPU registers, memory, and so forth that indicate the state of the system generally or specifically at the time of the corruption for debugging. This may include dumping data from the command buffer, GPU status registers, pixel buffer data, driver state, and placing the dumped data into a permanent memory for example. The interruption may be triggered at the same times as the breakpoint time points described above or otherwise may be triggered after a GPU has completed execution of a distinct set of data (such as a block, frame, or plane), and as controlled by the graphics driver. The dumped data can then be used for debugging whether the debugging is performed right away or subsequently at a more convenient time, such as after the system is done processing an entire video sequence for rendering.

Process 600 may include "log corruption" 636. Particularly, output or determination of the inference kernel, and specifically the output of the regression model, may be logged and stored in a convenient location such as on a table. This may be performed by showing the decision in a debug window (or debug application screen for a user to see the data on the screen), but otherwise can be saved to a file for later uploading and analysis).

Process 600 may include "perform debugging" 638. This operation may be initiated manually by a user upon receiving indication of the corrupt frame. The user may have the corrupt image and saved state of the computing device or system uploaded as well as any logged data holding a corruption decision for a frame. Otherwise, an automatically activated debugging application may initiate debugging programs upon receiving the corruption indication. In both cases, a breakpoint may have stopped the graphics processing for immediate debugging operations. Such indicators also can be provided without the breakpoint to provide notification that later debugging operations should be performed. The debugging techniques used may include debugging the computer state with a live debugger such as WinDbg or Visual Studio by looking at the registers, variables, past events such as if a topology change has just occurred, inspecting memory content and GPU commands, and so forth.

When the regression model is processing one block at a time and no corruption is found for a block, process 600 may include "analyze next block/image if any" 640, and a next block of image data for the current frame is obtained and analyzed. In this case, the corruption detection process (operations 614-640) returns to operation 614. The same loop to operation 614 may be immediately performed when corruption is detected in a block and no breakpoint has been issued for the graphics processing as well. In this case, there may be a pause for an interrupt as described but the graphics process may then continue.

In other cases, the graphics process (operations 610-612) is stopped whether a breakpoint is performed, an interrupt is performed, or both. The graphics process may be ended at this point for debugging. Alternatively, the graphics processing may be continued at the point it is stopped, but after the necessary data has been preserved in the appropriate places in memory, and whether debugging has or has not been performed during the break. By yet other forms when the regression model analyzes an entire frames worth of data at once, or when the last block of a frame has been analyzed, and whether or not corruption has occurred, the corruption detection process also loops back to operation 614 to analyze the first block of the next frame for example. The corruption detection process has ended when there are no more frames to process.

Test Results

In order to use the proposed solution for a large variety of situations and image content, and to breakpoint the graphics driver for the corrupted frame at least before graphics processing of the next frame starts, the processing or operations of the inference kernel should be sufficiently lightweight in computational load to process the frame and complete the feature extraction and inference while the graphics driver is performing rendering tasks. Thus, blocks of different sizes were tested to determine which block size provides both the best accuracy as well as a minimum computational load. Based on performance data shown below, processing of a 128×128 block of a frame provides the best performance-accuracy tradeoff.

The test inference kernel accuracy for detecting corruption is ~100% with ~0 false positive rate, where the time performance for processing the following stages per each block size tested is shown below.

| Kernel Operation | Time (ms) | | |
|---|---|---|---|
| | 64 × 64 | 128 × 128 | 256 × 256 |
| Convolution NN | 0.03 | 0.05 | 0.14 |
| Calculate gradient features | 0.02 | 0.05 | 0.12 |
| Extract Features statistics + Inference Polynomial | 0.04 | 0.09 | 0.23 |

The 128×128 block was found to provide the best tradeoff because of accuracy of the 128×128 block. The smaller the block size, the smaller the computation time for the above operations, but the larger the block size the greater the accuracy of the detection to better avoid false positives or false negatives.

While implementation of example process or system 400, 500, and/or 600 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
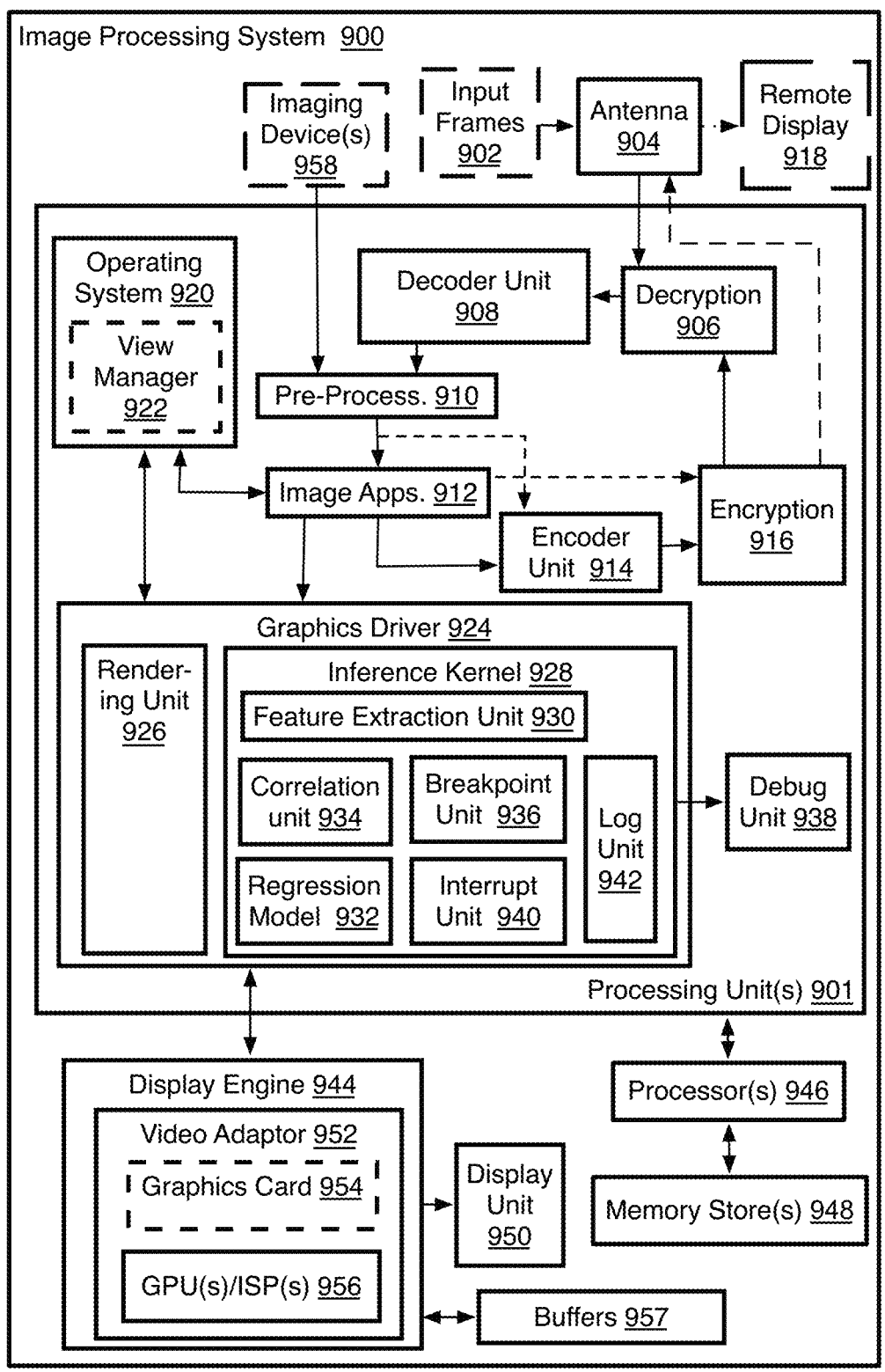
FIG. 9 is an illustrative diagram of an example system for operating a method of computer graphics processing system validation for processing of encrypted image content according to at least one of the implementations herein.

Referring to FIG. 9, an example image processing system 900 is used to perform computer graphics processing system validation for processing encrypted image content according to at least one of the implementations herein. The system 900 may have processing unit(s) 901 that are logic circuitry or modules to perform the operations described herein. This may include an operating system 920 that manages the computer hardware and software, an antenna 904 that receives input frames 902 or may transmit image data to a remote display device 918, a decryption unit 906 that may decrypt the input frames 902, a decoder unit 908 that may decode the input images, a pre-processing unit 910 that formats the image data for other applications, and image applications 912 that may use the decoded and decrypted images for various tasks. An encoder unit 914 may be provided to encode image data, and an encryption unit 916 may encrypt the encoded data for transmitting the image data via antenna 904 to the remote display device. Otherwise, for the validation purposes described herein, the encrypted data from the encryption unit 916 may be provided directly to the decryption unit 906, and also as mentioned above, this may be performed whether or not the image data is to be encoded and decoded.

The system 900 also has a graphics driver 924, and the OS 920 may communicate with, and control, the graphics driver 924 to have the graphics driver obtain the image data and perform rendering of images by using a display engine 944. The display engine 944 may or may not communicate with a display unit 950 to actually display the images as described above. The graphics driver 924 may have a rendering unit 926 and the inference kernel 928 to perform the corruption detection processes described above.

Also in the illustrated implementation, system 900 may include one or more central processing units and/or other types of processors 946, one or more memory stores 948 to store applications and image data described herein, and optionally one or more imaging devices 958 to capture images when desired. The display engine 944, processor(s) 946, and memory store 948 may be capable of communication with one another, via, for example, a bus, wires, or other access.

Now in more detail, the OS 920 may be many different operating systems and is not limited to any one type of OS as long as it has or communicates with a view manager 922 to perform rendering such as a desktop windows manager (DWM) by one example that may or may not be considered a part of the OS, and as long as the OS 920 or other component communicating with the OS can control the graphics driver as indicated herein. By one possible non-limiting example, the OS 920 may be Windows OS DirectX Graphics Infrastructure (DXGI). The display engine 944 may run hardware such as a display driver, video adaptor, or controller 952 which may be in the form of a graphics card 954 and/or one or more shared general purpose, or specific fixed function, graphics processing units (GPUs) and/or image signal processors (ISPs) 956 that may have buffers

957 that are loaded by the graphics driver 924, and may or may not be considered as part of memory 948.

The inference kernel 928 operated by, or considered a part of, the graphics driver 924 may have a feature extraction unit 930, a correlation unit 934 that operates a regression model unit 932, a breakpoint unit 936, an interrupt unit 940, and a log unit 942 all arranged to perform the tasks described in detail above and as the name of the unit suggests. A debug unit 938 is provided to perform the debugging operations described above as well when a corrupt frame is detected.

It will be understood that when system 900 is a single device, it may perform all of the processing for corruption detection including both the encryption side and decryption side operations where keys for both sides may be stored in memory 948 or other locations. By another approach, one system or device 900 only may perform the encoding and encryption before transmitting the encrypted images to another system or device 900 to perform the decryption, decoding, and corruption detection operations, and this may be performed to capture the effect of transmission errors on the encrypted image data as well.

As will be appreciated, the modules illustrated in FIG. 9 may include a variety of software and/or hardware modules and/or modules that may be implemented via software or hardware or combinations thereof if not already specified. For example, the modules may be implemented as software via processing units 901 or the modules may be implemented via a dedicated hardware portion. Also, system 900 may be implemented in a variety of ways. For example, system 900 may be implemented as a single chip or device having an accelerator or a graphics processor unit (GPU) which may or may not have ISPs, a quad-core central processing unit, and/or a memory controller input/output (I/O) module. In other examples, system 900 may be implemented as a chipset or a system on a chip (SoC), or any of the other structures mentioned herein.

Otherwise, processor(s) 946 may include any suitable implementation including, for example, microprocessor(s), multicore processors, application specific integrated circuits, chip(s), chipsets, programmable logic devices, graphics cards, integrated graphics, general purpose graphics processing unit(s), fixed function GPUs, other accelerators, or the like.

In addition, memory stores 948 and buffers 957 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 948 also may be implemented via cache memory.

In various implementations, the example video coding system 900 may use the imaging device 958 to form or receive captured image data. This can be implemented in various ways. Thus, in one form, the image processing system 900 may be one or more digital cameras or other image capture devices, and imaging device 901, in this case, may be the camera hardware and camera sensor software, module, or other components. In other examples, video coding system 900 may have an imaging device 958 that includes or may be one or more cameras, and processing units or logic modules 901 may communicate remotely with, or otherwise may be communicatively coupled to, the imaging device 958 for further processing of the image data.

Thus, video coding system 900 may be, or may be part of, or may be in communication with, one or more computers, one or more servers, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. By other forms, system 900 may have or be a computer, server, or any other computing device that has the capabilities described herein.

As illustrated, any of these components may be capable of communication with one another and/or communication with portions of logic modules 901. Thus, processors 946 and display engine 944 may be communicatively coupled to the logic modules 901 for operating those components. Although image processing system 900, as shown in FIG. 9, may include one particular set of blocks or actions associated with particular components or modules, these blocks or actions may be associated with different components or modules than the particular component or module illustrated here.

Figure 10:
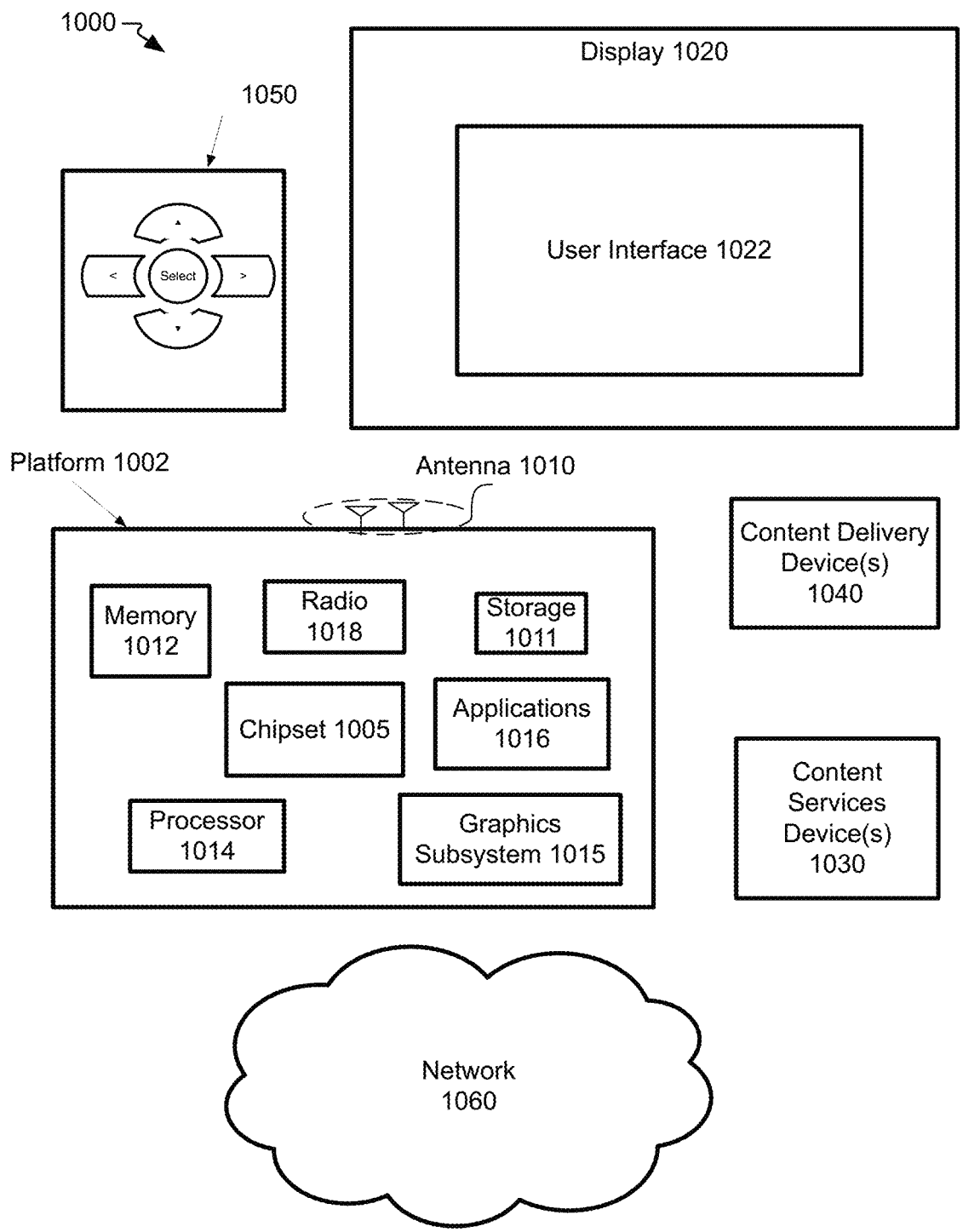
FIG. 10 is an illustrative diagram of another example system.

Referring to FIG. 10, an example system 1000 in accordance with the present disclosure and various implementations may embody system 1000 for example, and may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 communicatively coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1014, memory 1012, storage 1011, graphics subsystem 1015, applications 1016 and/or radio 1018 as well as antenna(s) 1010. Chipset 1005 may provide intercommunication among processor 1014, memory 1012, storage 1011, graphics subsystem 1015, applications 1016 and/or radio 1018. For example, chipset 1005 may include a storage adapter (not depicted) capable of providing intercommunication with storage 1011.

Processor 1014 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1014 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1011 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1011 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1014 or chipset 1005. In some implementations, graphics subsystem 1015 may be a stand-alone card communicatively coupled to chipset 1005.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In implementations, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
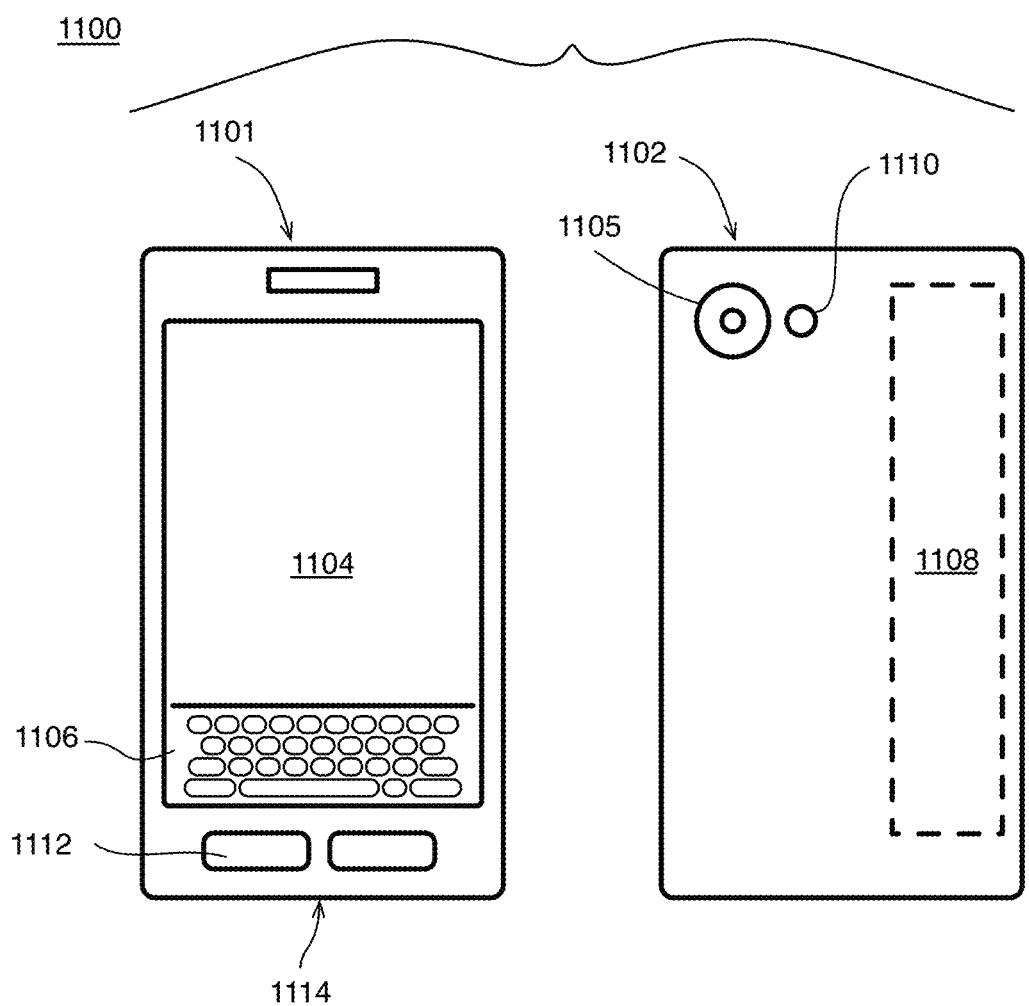
FIG. 11 illustrates another example device, all arranged in accordance with at least some implementations of the present disclosure.

Referring to FIG. 11, a small form factor device 1100 is one example of the varying physical styles or form factors in which systems 2900 or 3000 may be embodied. By this approach, device 1100 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone 1114, or may be digitized by a voice recognition device. As shown, device 1100 may include a camera 1105 (e.g., including at least one lens, aperture, and imaging sensor) and a flash 1110 integrated into back 1102 (or elsewhere) of device 1100. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the p resent disclosure pertains are deemed to lie within the spirit and scope of the present disclosure.

The following examples pertain to additional implementations.

By an example first implementation, a computer-implemented method of graphics processing validation, comprises obtaining image data of at least one image; performing graphics processing to render the at least one image; automatically determining whether the image data indicates a point of corruption in the graphics processing and determined during or after graphics processing of the at least one image but before the graphics processing of a next consecutive image, wherein the corruption is at least partly due to operations to protect content of the at least one image from unauthorized access; and automatically performing a debugging-related action using the point of corruption.

Further to the first implementation, the method comprises preforming feature extraction on the at least one image that extracts features that indicate the existence of the corruption.

Further to the first implementation, the method comprises preforming feature extraction on the at least one image that extracts features that indicate the existence of the corruption; and inputting a version of the image data into a neural network to extract the features.

Further to the first implementation, the method comprises preforming feature extraction on the at least one image that extracts features that indicate the existence of the corruption; and inputting a version of the image data into a neural network to extract the features, wherein the neural network includes two neural network layers without any other neural network layer.

Further to the first implementation, the method comprises preforming feature extraction on the at least one image that extracts features that indicate the existence of the corruption; and inputting a version of the image data into a neural network to extract the features, wherein the neural network includes two neural network layers without any other neural network layer, and wherein the neural network layers are convolutional layers.

Further to the first implementation, the method comprises preforming feature extraction on the at least one image that extracts features that indicate the existence of the corruption, where the features are image data gradients.

Further to the first implementation, the method comprises inputting a version of the image data into a machine learned model trained on corrupt images resulting from the type of corruption that is due to operations to protect content of an image from unauthorized access, wherein the corrupt images have image data gradient patterns that indicate the corruption.

Further to the first implementation, the method comprises inputting a version of the image data into a machine learned model trained on corrupt images resulting from the type of corruption that is due to operations to protect content of an image from unauthorized access, wherein the corrupt images have image data gradient patterns that indicate the corruption, and wherein the machine learned model comprises an equation that compares gradients of the at least one image and gradients of corrupt images.

Further to the first implementation, the method comprises inputting a version of the image data into a machine learned model trained on corrupt images resulting from the type of corruption that is due to operations to protect content of an image from unauthorized access, wherein the machine learned model is formed of at least one polynomial correlation regression equation.

Further to the first implementation, the method comprises inputting a version of the image data into a machine learned model trained on corrupt images resulting from the type of corruption that is due to operations to protect content of an image from unauthorized access.

Further to the first implementation, the method comprising wherein the debugging-related action comprises at least one of: logging the results of the determination, automatically performing a breakpoint in the graphics processing to stop graphics processing to permit a time to perform debugging on graphics code performing the graphics processing, and automatically performing an interruption to capture and store data indicating the state of a computing device performing the graphics processing.

By an example second implementation, a computer-implemented system comprises: at least one display; memory to store image data of at least one image; at least one processor communicatively coupled to the memory and display, and the at least one processor to operate by: performing graphics processing to render the at least one image; automatically determining whether the image data indicates a point of corruption in the graphics processing and determined during or after the graphics processing of the at least one image but before the graphics processing of a next consecutive image, wherein the corruption is at least partly due to operations to protect content of the at least one image from unauthorized access; and automatically performing a debugging-related action using the point of corruption.

Further to the second implementation, wherein the determining comprises determining whether the image data has gradients that sufficiently match gradients of corrupt images comprising using a machine learned model trained on the corrupt images.

Further to the second implementation, wherein the debugging-related action comprises performing a breakpoint in the code performing the graphics processing to render the at least one image.

Further to the second implementation, wherein the debugging-related action comprises performing a breakpoint in the code performing the graphics processing to render the at least one image, and the at least one processor is to operate by initiating the breakpoint comprising initiating a breakpoint at or near a point of the corruption during running of the code regardless of whether or not a predetermined conditional breakpoint has been set to be available in the code at the breakpoint location within the code.

Further to the second implementation, wherein the debugging-related action comprises performing a breakpoint in the code performing the graphics processing to render the at least one image, and wherein the breakpoint is arranged to stop the graphics processing operations at the location of the breakpoint in the code and at least one of: permit a user to manually initiate a debugging program, and automatically initiate a debugging program.

Further to the second implementation, wherein the debugging-related action is performing an interrupt that downloads data of memory indicating the state of the system at the time of the point of corruption during the graphics processing.

Further to the second implementation, wherein the debugging-related action comprises logging the results of the determining as a binary value that represents corrupt or not corrupt of an image when at least one block of an image is found to be corrupt.

Further to the second implementation, the system comprises an inference kernel operated by the at least one processor and that performs operations to detect and isolate the conditions of the corruption comprising feature extraction to extract image features that indicate the corruption, operation of a machine learning model using a regression equation pre-trained on corrupt images and receiving the features as inputs to detect the point of corruption, breakpoint setting to stop graphics processing at or near the point of corruption to permit debugging operations, and interruption initiation to save the state of the system at or near the point of corruption.

As an example third implementation, at least one non-transitory computer-readable medium has stored thereon instructions that when executed cause a computing device to operate by obtaining image data of at least one image; performing graphics processing to render the at least one image; automatically determining whether the image data indicates a point of corruption in the graphics processing and determined during or after the graphics processing of the at least one image but before the graphics processing of a next image, without the need of obtaining reference image data to compare to the at least one image during or after the graphics processing, wherein the corruption is at least partly due to operations to protect content of the at least one image from unauthorized access; and automatically performing a debugging-related action using the point of corruption.

Further to the third implementation, wherein the automatically determining comprises inputting image data gradients into a regression model equation that is trained on gradients of corrupted images.

Further to the third implementation, wherein the automatically determining comprises analyzing an image block by block for the corruption.

Further to the third implementation, wherein the automatically performing a debugging-related action comprises initiating a breakpoint that stops graphics processing or an interrupt that performs a dumping of data in memory that indicates the state of a system performing the graphics processing or both.

Further to the third implementation, wherein the automatically performing a debugging-related action comprises initiating a breakpoint that stops graphics processing or an interrupt that performs a dumping of data in memory that indicates the state of a system performing the graphics processing or both, and wherein the action is performed during or just after a current frame is processed to be rendered and before the graphics processing of a next frame to be rendered is started.

Further to the third implementation, wherein the automatically performing a debugging-related action comprises initiating a breakpoint that stops graphics processing or an interrupt that performs a dumping of data in memory that indicates the state of a system performing the graphics processing or both, and wherein the action is a breakpoint performed after one or more planes of image data of a current frame is complete and before the planes are reset with image data for a next frame and to be input to graphics rendering processing.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of graphics processing validation, comprising:
   obtaining image data of at least one image;
   performing graphics processing to render the at least one image;
   automatically determining whether the image data indicates a point of corruption in the graphics processing, wherein the corruption is at least partly due to operations to protect content of the at least one image from unauthorized access; and
   automatically performing a debugging-related action using the point of corruption.

2. The method of claim 1 wherein the at least one image is in a video sequence of images, and wherein the determining is performed during the graphics processing of the video sequence.

3. The method of claim 1 wherein the determining is performed during or after graphics processing of the at least one image but before the graphics processing of a next image.

4. The method of claim 1 wherein the determining comprises using a neural network to extract features from a version of the at least one image and that indicate existence of the corruption.

5. The method of claim 4 wherein the neural network includes two neural network convolutional layers without any other neural network layer.

6. The method of claim 4 wherein the features are image data gradients.

7. The method of claim 4 wherein the determining comprises inputting the features into a machine learned model to detect the corruption.

8. The method of claim 7 comprising inputting a version of the image data into a machine learned model trained on corrupt images resulting from a type of corruption that is due to operations to protect content of an image from unauthorized access.

9. The method of claim 7 wherein the machine learned model comprises a regression equation that compares gradients of the at least one image and gradients of corrupt images.

10. The method of claim 1 wherein the debugging-related action comprises at least one of:
    logging results of the determination,
    automatically performing a breakpoint in the graphics processing to stop graphics processing to permit a time to perform debugging on graphics code performing the graphics processing, and
    automatically performing an interruption to capture and store data indicating a state of a computing device performing the graphics processing.

11. A computer-implemented image processing device comprising:
    at least one display;
    memory to store image data of at least one image;
    at least one processor communicatively coupled to the memory and display, wherein the at least one processor to operate by:
      performing graphics processing to render the at least one image;
      automatically determining whether the image data indicates a point of corruption in the graphics processing, wherein the corruption is at least partly due to operations to protect content of the at least one image from unauthorized access; and automatically performing a debugging-related action using the point of corruption.

12. The device of claim 11 wherein the determining comprises determining whether the image data has gradients that sufficiently match gradients of corrupt images comprising using a machine learned model trained on the corrupt images.

13. The device of claim 11 wherein the debugging-related action comprises performing a breakpoint in code performing the graphics processing to render the at least one image.

14. The device of claim 13 wherein the at least one processor is arranged to operate by initiating the breakpoint at or near a point of the corruption during running of the code regardless of whether or not a predetermined conditional breakpoint has been set to be available in the code at a breakpoint location within the code.

15. The device of claim 13 wherein the breakpoint is arranged to stop the graphics processing operations at a location of the breakpoint in the code and at least one of: permit a user to manually initiate a debugging program, and automatically initiate a debugging program.

16. The device of claim 11 comprising an inference kernel operated by the at least one processor and that performs operations to detect and isolate conditions of the corruption comprising feature extraction to extract image features that indicate the corruption, operation of a machine learning model using a regression equation pre-trained on corrupt images and receiving the features as inputs to detect the point of corruption, breakpoint setting to stop graphics processing at or near the point of corruption to permit debugging operations, and interruption initiation to save a state of the device at or near the point of corruption.

17. At least one non-transitory computer-readable medium having stored thereon instructions that when executed cause a computing device to operate by:

obtaining image data of at least one image;

performing graphics processing to render the at least one image;

automatically determining whether the image data indicates a point of corruption in the graphics processing, without need of obtaining reference image data to compare to the at least one image to make the determination, wherein the corruption is at least partly due to operations to protect content of the at least one image from unauthorized access; and automatically performing a debugging-related action using the point of corruption.

18. The medium of claim 17 wherein the determining occurs during or after the graphics processing of the at least one image but before the graphics processing of a next image.

19. The medium of claim 17 wherein the determining comprises inputting image data gradients into a regression model equation that is trained on gradients of corrupted images.

20. The medium of claim 17 wherein the automatically determining comprises analyzing an image block by block for the corruption.

21. The medium of claim 17 wherein the debugging-related action is performing an interrupt that downloads data of memory indicating the state of the device at the time of the point of corruption during the graphics processing.

22. The medium of claim 17 wherein the debugging-related action comprises logging the results of the determining as a binary value that represents corrupt or not corrupt of an image when at least one block of an image is found to be corrupt.

23. The medium of claim 17 wherein the automatically performing a debugging-related action comprises initiating a breakpoint that stops graphics processing or an interrupt that performs a dumping of data in memory that indicates the state of a system performing the graphics processing or both.

24. The medium of claim 23 wherein the action is performed during or just after a current frame is processed to be rendered and before the graphics processing of a next frame to be rendered is started.

25. The medium of claim 23 wherein the action is a breakpoint performed after one or more planes of image data of a current frame is complete and before the planes are reset with image data for a next frame and to be input to graphics rendering processing.

* * * * *